(12) United States Patent
Lunttila et al.

(10) Patent No.: US 11,076,312 B2
(45) Date of Patent: *Jul. 27, 2021

(54) REPORTING CHANNEL STATE INFORMATION IN A MULTIPLE COMPONENT CARRIER NETWORK

(71) Applicant: WIRELESS FUTURE TECHNOLOGIES INC., Ottawa (CA)

(72) Inventors: Timo Erkki Lunttila, Espoo (FI); Esa Tapani Tiirola, Kempele (FI); Kari Pekka Pajukoski, Oulu (FI); Kari Juhani Hooli, Oulu (FI)

(73) Assignee: WIRELESS FUTURE TECHNOLOGIES INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,452

(22) Filed: Feb. 3, 2020

(65) Prior Publication Data
US 2020/0178103 A1 Jun. 4, 2020

Related U.S. Application Data

(63) Continuation of application No. 15/483,699, filed on Apr. 10, 2017, now Pat. No. 10,555,198, which is a (Continued)

(51) Int. Cl.
*H04W 24/10* (2009.01)
*H04L 5/00* (2006.01)
(Continued)

(52) U.S. Cl.
CPC ........... *H04W 24/10* (2013.01); *H04L 1/0026* (2013.01); *H04L 1/0029* (2013.01);
(Continued)

(58) Field of Classification Search
None
See application file for complete search history.

(56) References Cited

U.S. PATENT DOCUMENTS

8,072,899 B2 12/2011 Pan
2007/0230397 A1 10/2007 Sakata
(Continued)

FOREIGN PATENT DOCUMENTS

CN 101615984 12/2009
JP 2007-274094 10/2007
(Continued)

OTHER PUBLICATIONS

HT MMobile, Inc. "Discussion on Scheduling and Priority Handling for Carrier Aggregation," 3GPP TSG RAN WG2 Meeting #68bis, R2-100574 (Jan. 18-22, 2010).
(Continued)

*Primary Examiner* — Gregory B Sefcheck
*Assistant Examiner* — Amarnauth G Persaud
(74) *Attorney, Agent, or Firm* — Volpe Koenig

(57) ABSTRACT

A user equipment (UE) may determine channel state information (CSI) reports with each CSI report being related to a component carrier. The UE may send a subframe with CSI report(s) on a physical uplink control channel (PUCCH). When a collision occurs in the subframe having the CSI report(s) on the PUCCH a lower priority CSI report may be dropped from the transmission.

12 Claims, 4 Drawing Sheets

Related U.S. Application Data continuation of application No. 15/137,940, filed on Apr. 25, 2016, now Pat. No. 9,622,227, which is a continuation of application No. 13/948,852, filed on Jul. 23, 2013, now Pat. No. 9,325,479, which is a continuation of application No. 12/752,572, filed on Apr. 1, 2010, now Pat. No. 8,520,491.

(51) Int. Cl.

| | | |
|---|---|---|
| *H04W 72/04* | (2009.01) | |
| *H04W 72/10* | (2009.01) | |
| *H04L 1/00* | (2006.01) | |
| *H04W 72/08* | (2009.01) | |
| *H04W 88/08* | (2009.01) | |

(52) U.S. Cl.
CPC ............ *H04L 1/0031* (2013.01); *H04L 5/001* (2013.01); *H04L 5/0057* (2013.01); *H04L 5/0091* (2013.01); *H04W 72/0413* (2013.01); *H04W 72/0453* (2013.01); *H04W 72/10* (2013.01); *H04L 5/0053* (2013.01); *H04W 72/085* (2013.01); *H04W 88/08* (2013.01)

(56) References Cited

U.S. PATENT DOCUMENTS

| | | | |
|---|---|---|---|
| 2008/0253336 | A1 | 10/2008 | Parkvall et al. |
| 2008/0273624 | A1* | 11/2008 | Kent .................. H04B 7/0634 375/296 |
| 2009/0207784 | A1 | 8/2009 | Lee et al. |
| 2009/0303951 | A1 | 12/2009 | Lunttila et al. |
| 2010/0226327 | A1* | 9/2010 | Zhang .................. H04L 1/0027 370/329 |
| 2011/0032895 | A1 | 2/2011 | Englund et al. |
| 2011/0080965 | A1 | 4/2011 | Liu et al. |
| 2011/0081932 | A1* | 4/2011 | Astely .................. H04L 5/0053 455/509 |
| 2011/0092219 | A1 | 4/2011 | Damnjanovic et al. |
| 2011/0134771 | A1 | 6/2011 | Chen et al. |
| 2011/0141926 | A1 | 6/2011 | Damnjanovic |
| 2011/0194516 | A1* | 8/2011 | Aiba .................. H04L 5/143 370/329 |
| 2011/0249578 | A1 | 10/2011 | Nazar et al. |
| 2011/0317652 | A1 | 12/2011 | Kim et al. |
| 2012/0040622 | A1 | 2/2012 | Ren et al. |
| 2012/0051257 | A1* | 3/2012 | Kim .................. H04B 7/0617 370/252 |
| 2012/0120838 | A1 | 5/2012 | Farajidana et al. |
| 2012/0147856 | A1 | 6/2012 | Kazmi et al. |
| 2012/0314675 | A1 | 12/2012 | Vujcic |
| 2012/0314679 | A1 | 12/2012 | Lee et al. |
| 2015/0110043 | A1 | 4/2015 | Fan |

FOREIGN PATENT DOCUMENTS

| | | |
|---|---|---|
| JP | 2011-509018 | 3/2011 |
| JP | 2013-524561 | 6/2013 |
| WO | 2009088225 A2 | 7/2009 |
| WO | 2010/026936 | 3/2010 |

OTHER PUBLICATIONS

International Search Report and Written Application, PCT Application No. PCT/EP2011/054988 (dated Jun. 17, 2011).
Japanese Office Action Notification of Reason for Rejection, Application No. 2013-501847 (dated Dec. 16, 2013).
LG Electronics, "UL control channel design to support carrier aggregation," 3GPP TSG RAN WG1 #56bis, R1-091204, Seoul, Korea (Mar. 23-27, 2009).
Mitsubishi Electric, "Consideration of PUCCH(CSI) Signaling with Carrier Aggregation," 3GPP TSG WG1 #59bis, R1-100550, pp. 1-2 (Jan. 18-22, 2010).
Motorola, "Introduction of Rel-10 LTE-Advanced features in 36.213," 3GPP TSG-RAN Meeting #63, R1-106557, Jacksonville, USA (Nov. 15-19, 2010).
Panasonic, "Periodic CQI Reporting for Carrier Aggregation," 3GPP TSG-RAN WG1 Meeting 60, R1-101258, pp. 1-3 (Feb. 22-26, 2010).
Qualcomm Incorporated, "UL Power Control for Multicarrier Operation," R1-100677, 3GPP TSG RAN WG1 #59bis, Valencia, Spain (Jan. 18-22, 2010).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.1.0 (Mar. 2010).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.8.0 (Dec. 2009).
Third Generation Partnership Project, "Technical Specification Group Radio Access Network; Evolved Universal Terrestrial Radio Access (E-UTRA) Radio Resource Control (RRC); Protocol specification (Release 9)," 3GPP TS 36.331 V9.1.0 (Dec. 2009).

\* cited by examiner

REPORTING CHANNEL STATE INFORMATION IN A MULTIPLE COMPONENT CARRIER NETWORK

CROSS REFERENCE TO RELATED APPLICATIONS

This application is a continuation of U.S. patent application Ser. No. 15/483,699, filed Apr. 10, 2017, which is a continuation of U.S. patent application Ser. No. 15/137,940 filed Apr. 25, 2016, which issued as U.S. Pat. No. 9,622,227 on Apr. 11, 2017, which is a continuation of U.S. patent application Ser. No. 13/948,852 filed Jul. 23, 2013, which issued as U.S. Pat. No. 9,325,479 on Apr. 26, 2016, which is a continuation of U.S. patent application Ser. No. 12/752,572 filed Apr. 1, 2010, which issued as U.S. Pat. No. 8,520,491 on Aug. 27, 2013, which are incorporated by reference as if fully set forth.

FIELD OF INVENTION

The present invention relates generally to communications and particular to communications over multiple carriers. More particularly, in certain embodiments the present invention provides a mechanism for periodic channel state information signaling that employ carrier aggregation.

BACKGROUND

There has not been any significant prior work on related signaling details of periodic channel state information (CSI) with multiple parallel configurations in the case of multiple component carriers (CCs). Contributions in the Third Generation Partnership Project (3GPP) tend to focus on extending the physical uplink control channel (PUCCH) payload beyond 11 bits, which would permit new, larger CSI formats.

Activation and deactivation of component carriers has been discussed. There has also been some discussion about the concept of primary and secondary component carriers in radio access network 2 (RAN2): primary component carrier (PCC), and secondary component carrier (SCC), respectively.

SUMMARY

In one embodiment, the present invention is a method. The method includes determining, in an apparatus, channel state information. The channel state information includes channel state information of a plurality of component carriers. The method also includes reporting, by the apparatus, the channel state information comprising a plurality of reports in an aggregated form.

In a further embodiment, the present invention is an apparatus. The apparatus includes at least one memory including computer program code. The apparatus also includes at least one processor. The at least one memory and the computer program code are configured to, with the at least one processor, cause the apparatus at least to determine channel state information. The channel state information includes channel state information of a plurality of component carriers. The at least one memory and the computer program code are also configured to, with the at least one processor, cause the apparatus at least to report the channel state information comprising a plurality of reports in an aggregated form.

In a further embodiment, the present invention is a computer-readable non-transitory medium encoded with information that, when executed in hardware, performs a process. The process includes determining channel state information. The channel state information includes channel state information of a plurality of component carriers. The process also includes reporting the channel state information comprising a plurality of reports in an aggregated form.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
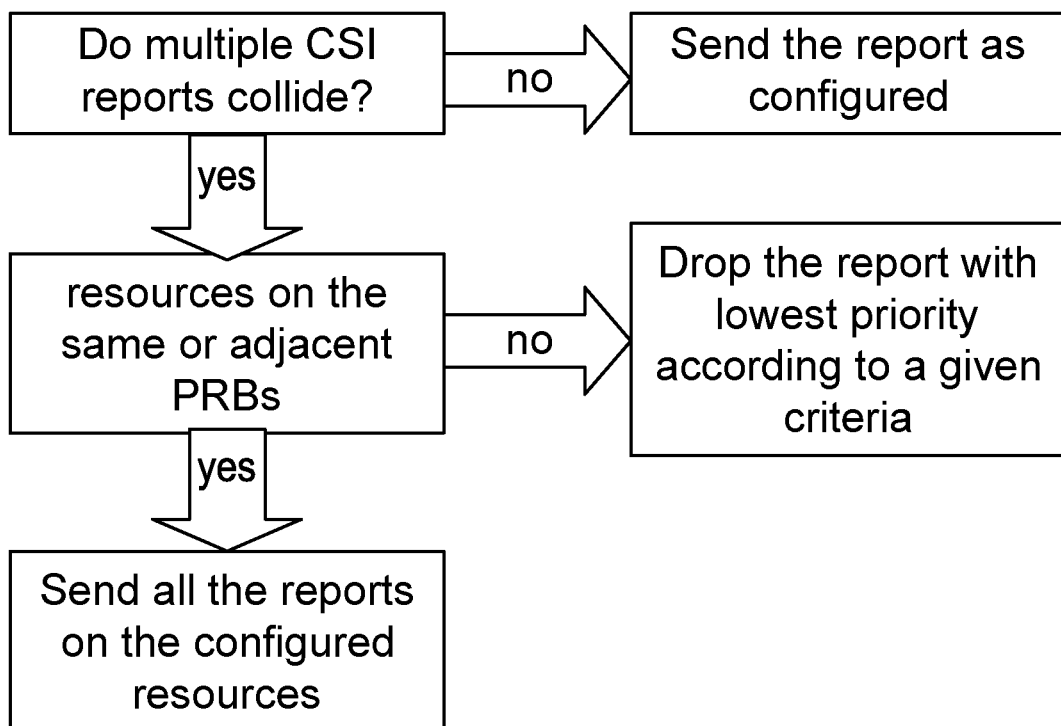
FIG. 1 illustrates an example of an implementation for handling collisions between channel state information reports.

Channel State Information (CSI) feedback signaling with carrier aggregation may be useful in the Long Term Evolution (Advanced) (LTE-Advanced) of the Third Generation Partnership Project (3GPP) system, which may be a part of 3GPP LTE Release 10 (3GPP LTE Rel-10).

LTE-Advanced may serve as an evolution of the LTE Release 8 (Rel-8) system, fulfilling the International Telecommunication Union (ITU) Radiocommunication Sector (ITU-R) requirements for International Mobile Telecommunications-Advanced (IMT-Advanced). Carrier aggregation will be one technology component aimed at providing high bandwidth and peak data rates for the new system.

An efficient way to provide channel state information (CSI) reporting for multiple component carriers (CCs) can help to make efficient use of aggregated spectrum. Periodic CSI signaling aspects on the physical uplink control channel (PUCCH) and especially the rules and procedures related to handling multiple CSI reporting configurations will be discussed below.

Periodic reporting of CSI such as channel quality indicator (CQI), precoding matrix indicator (PMI), and rank indicator (RI) is the fundamental mode of feedback signaling in LTE Rel-8. The periodic CSI reports are carried on PUCCH, and the payload size is typically limited to a maximum of 11 bits. Due to the limited payload size, the reports typically contain little or no information about the frequency domain behavior of the channel.

With carrier aggregation, the need for periodic CSI may remain. LTE-Advanced (Rel-10) may, for example, support approximately five downlink (DL) CCs. Hence the straightforward expansion of Rel-8 reporting for multiple CCs would result in large reports (e.g. 5*11 bits=55 bits). This may not be helpful from the uplink (UL) signaling point of view. First, such high overhead may limit uplink capacity considerably. Second, in many cases it may not be possible to guarantee sufficient UL coverage for such large payloads. Hence some compression methods may be used to reduce the UL signaling burden.

The most straightforward way to reduce the signaling load is to configure CSI reporting separately for each CC. This option can assist standardization, maximizing the commonality with Rel-8 specifications. Furthermore, the DL transmission mode can be configured separately for each DL CC, which would make joint encoding of the CSI reports complicated, or at least lead to a large number of supported options.

There are a number of ways that component carriers can be handled in a communication system. For example, there can be explicit activation and deactivation of configured downlink (DL) component carriers is done by media access control (MAC) signaling. There can also be implicit deactivation of configured DL component carriers. The configuration of a DL/UL component carrier can be within a user equipment's (UE's) aggregation capability. As a consequence, activation/deactivation as well can be within UE capability.

A newly configured component carrier can always be in a default state of "deactivated." In order to activate a newly configured component carrier, an activation command may be necessary. Furthermore, DL component carriers can be activated and deactivated individually. A single activation/deactivation command can activate/deactivate a subset of the configured DL component carriers.

The uplink (UL) primary component carrier (PCC) and DL PCC can be configured per UE. The UL PCC can be used for transmission of L1 uplink control information. In certain embodiments, the DL PCC cannot be de-activated. Re-establishment can be triggered when the DL PCC experiences radio link failure (RLF), as opposed to when other DL CCs experience RLF. These implementations, however, are merely examples of how component carriers can be handled.

The following discussion focuses on the rules and procedures related to handling multiple CSI reporting configurations. Such rules for handling multiple CSI reporting configurations may be useful when transmitting a CSI for multiple CCs simultaneously in the same subframe. This situation may be described as being the state that exists when multiple configurations collide.

The rules and procedures may relate to handling periodic CSI reporting for carrier aggregation using PUCCH with multiple parallel configurations. The multiple parallel configurations may be CC-specific.

For each configured DL CC, a periodic CSI reporting mode can be configured. Reporting disabled is here considered as a reporting mode, a special case of configuration. In other words, the reporting disabled case can be considered a periodic report having the frequency of "never." The configuration can be done using RRC signaling and includes parameters such as periodicity, subframe offset, reporting mode, PUCCH resource used for reporting etc.

For the primary component carrier (PCC) the UE can start reporting CQI after it has received the CQI configuration via radio resource control (RRC) signaling. This follows similar procedures as in LTE Rel-8.

For the secondary component carriers (SCC) the UE can start to report CQI according to the RRC configuration after it has received an activation command for the given CC with media access control (MAC) signaling.

In the case of CC deactivation, the UE can stop reporting CSI for that CC. In other words, there may be no requirement that the UE report regarding inactive CCs.

In certain embodiments, when the periodic reports for two or more CCs would collide, the following complementary rules take place. The rules are numbered for the sake of identification. Unless otherwise noted, one should not treat the numbers as though they were setting forth a fixed sequence, such that, for example, 2 must come after 1 and before 3.

Option 1 is multiplexing. In this option, when the PUCCH resources for the colliding CSI reports are located on the same or the adjacent PRB, all the CSI reports can be sent simultaneously. Each UE may be configured to omit this option and always perform the dropping of colliding CSI reports according to the following options, which involve prioritization.

Option 2 gives infrequent reports a priority. In this option, the CC configuration with lowest periodicity is prioritized and the other simultaneous reports are omitted. In the case of equal periodicity, a CSI corresponding to a predetermined CC is sent while the CSI(s) corresponding to other CC(s) is/are dropped, similar to Option 4 discussed below.

Option 3 gives rank indicators priority. In this option, a report containing RI is prioritized over CQI/PMI. In the case when the need to transmit them simultaneously occurs, CQI/PMI is dropped.

Option 4 ranks different CCs separately. The priority order for different CCs can be configured separately. This can be done with e.g. RRC configuration. The configuration indicates in which order the CSI from different CCs is prioritized. In the case of collision the CSI for the CC with higher priority is sent while the other one is dropped.

Option 5 gives priority to primary component carriers over secondary component carriers. In this option, CSI reports for PCC are prioritized over SCC.

Various combinations of different options are also possible. For example, Option 2 and Option 3 can be combined. Option 1 can be also combined with Option 2, 3, 4 or 5 in the case that some but not all CSI reports are located on the same or the adjacent PRB. Thus, for example, a first single CSI report according to one of options 2-5 is selected, and after that other CSI reports on same or adjacent PRB are also selected for transmission.

The reporting configuration for the DL PCC can follows the Rel-8 principles. For the SCC(s) the CSI reporting can be masked with the activation/deactivation command received via MAC signaling. There can be, for example, a bitmap indicating which of the SCCs are activated or deactivated.

An example of an implementation for handling collisions between CSI reports can be summarized with the block diagram shown in FIG. 1. The embodiment of FIG. 1 shows a decision tree, which can be one way in which certain embodiments of the present invention is implemented.

As shown in FIG. 1, when the need arises to transmit CSI reports for two or more CCs simultaneously occurs (first yes branch from the top of the diagram), a device can first check whether the PUCCH resources configured for transmission of the CSI reports are on a single, or alternatively on adjacent, PRBs. One reason for imposing such a restriction is that transmission on multiple non-adjacent PUCCHs could violate single-carrier properties, resulting in increased cubic metric and out-of-band emissions.

If the colliding reports meet the criteria, as illustrated, for example, in the second yes branch from the top of the diagram, the reports are sent according to their respective configurations. If the colliding reports do not meet the criteria, as illustrated for example, in the lower no branch, only the reports with highest priority are sent. To determine the highest priority, options 2, 3, 4, or 5, discussed above or a combination thereof can be employed.

Alternatively, the multiplexing functionality may also be configurable. For example, one can limit a cell edge user equipment (UE) not to send more than one CSI report at a time in any case.

The condition for concurrent transmission of multiple PUCCH Format 2/2a/2b resources can be formulated in the following way (NxPUCCH Format 2/2a/2b):

First, a physical resource block (PRB) index m can be defined for a $k^{th}$ PUCCH Format 2/2a/2b resource as $$m(k)=\lfloor n_{PUCCH}^{(2)}(k)/N_{sc}^{RB}\rfloor$$

where $n_{PUCCH}^{(2)}$ is the higher-layer configured resource index for a periodic CSI transmitted on PUCCH and $N_{sc}^{RB}$ is the number of sub-carriers (SC) per PRB (there may be 12 sub-carriers per resource block), respectively.

The criteria for concurrent transmission of multiple PUCCH format 2/2a/2b resources can be formulated as $$m(k)\in[b,(b+2n)],$$

where b is an integer and $n\in[0, 1, \ldots, N]$ where N is a predefined integer. Integer b can be defined as b=min(m(k)). This criteria ensures that PUCCH resources transmitted at the same time are located on the same side of the system bandwidth. There are two special cases with n=0 and n=1:

n=0: PUCCH resources are located on the same PRB; and
n=1: PUCCH resources are located on adjacent PRBs.

In principle, PUCCH resources can be located on multiple adjacent PRBs. To also cover this case, the criteria can be checked sequentially: sort m(k) in increasing order, N=1, b=min(m(k)); and starting from smallest m(k), check criteria. If it is filled, update N=m(k)+1 for current k and continue.

Certain embodiments of the present invention may have various advantages. For example, certain embodiments of the present invention may permit independent configuration per CC, which may permit reuse of the Rel-8 functionality as much as possible. Additionally, since there are no existing solutions for handling collisions between CSI reports, the approach above may be implemented widely, such as by means of a standard. Moreover, allowing for multiplexing of CSIs when they are transmitted on a single or adjacent PRBs brings advantages in terms of performance, assuming that sufficient coverage can be guaranteed.

Figure 2:
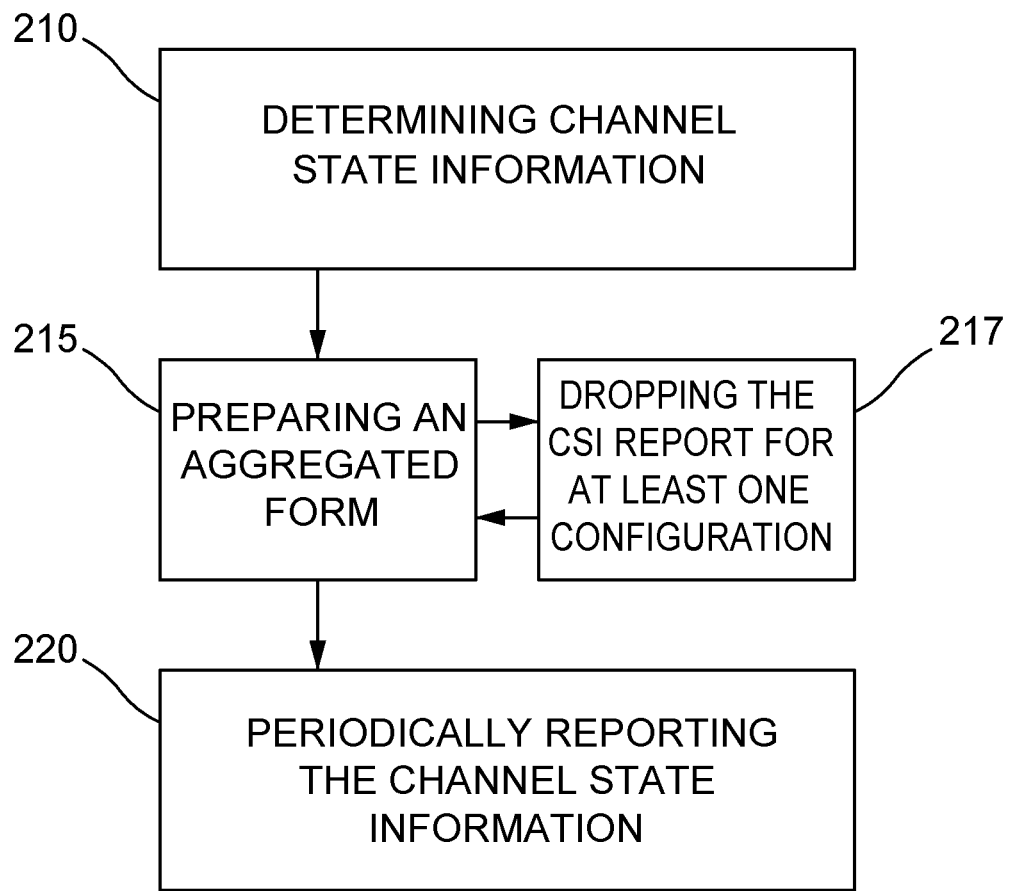
FIG. 2 illustrates a method according to certain embodiments of the present invention.

FIG. 2 illustrates a method according to certain embodiments of the present invention. The method can be performed by an apparatus such as a terminal, a user equipment, or a mobile node. The method of FIG. 2 includes determining 210, in an apparatus, channel state information. The channel state information includes channel state information of a plurality of component carriers. The method also includes periodically reporting 220, by the apparatus, the channel state information comprising a plurality of reports in an aggregated form. An aggregated form can include several independent reports. The periodically reporting 220 can be performed via a physical uplink control channel.

The method can include preparing 215 the aggregated form. The preparing 215 can include dropping 217 at least the channel state information report for at least one configuration based on a priority. It should be noted that a configuration for a component carrier may include more than one report.

After channel state information of a first component carrier is selected for inclusion in the aggregated form based on a priority, other channel state information corresponding to component carriers that have the same or an adjacent physical resource block can also be selected for inclusion in the aggregated form. The priority can be, for example, lowest periodicity of reporting. In other words, the highest priority can be assigned to a component carrier whose report is to be sent the most infrequently.

As may be understood from the discussion above, a computer-readable non-transitory medium can be encoded with information that, when executed in hardware, performs a process corresponding to the process disclosed in FIG. 2, or any other process discussed herein. By non-transitory medium, it is meant that the medium is not a transitory signal. Examples of non-transitory mediums include a computer-readable medium, a computer distribution medium, a computer-readable storage medium, and a computer program product.

Channel state information for component carrier configurations having equal periodicity can be prioritized according to a predetermined ranking for component carriers. Channel state information for component carrier configurations comprising a rank indicator can be prioritized above channel state information for component carrier configurations comprising channel quality indicator or precoding matrix indicator. Alternatively, or in addition, a plurality of component carrier configurations can be individually assigned a predetermined priority. Channel state information for primary component carriers can be prioritized over channel state information for secondary component carriers.

Figure 3:
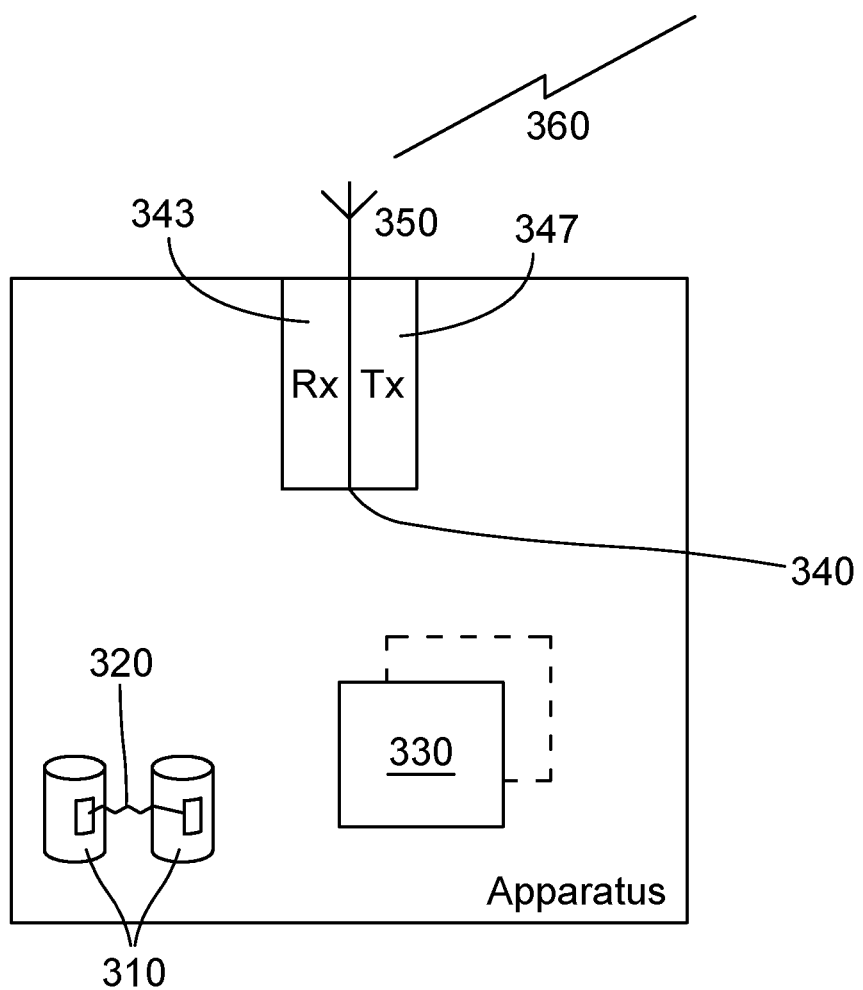
FIG. 3 illustrates an apparatus according to certain embodiments of the present invention.

FIG. 3 illustrates an apparatus according to certain embodiments of the present invention. The apparatus can include at least one memory 310 including computer program code 320. The apparatus can also include at least one processor 330. The apparatus can be configured to communicate using a transceiver 340, including a receiver portion 343 and a transmitter portion 347, with a base station or enhanced node B (not illustrated). The apparatus can use an antenna 350 to communicate with the base station or other network element over a wireless link 360, which may be a cellular radio link. The apparatus can be configured to prepare reports regarding, for example, downlink (DL) quality for component carriers of the wireless link 360.

In the process, the at least one memory 310 and the computer program code 320 can be configured to, with the at least one processor 330, cause the apparatus at least to determine channel state information. The channel state information can be channel state information of a plurality of component carriers. The at least one memory 310 and the computer program code 320 can also be configured to, with the at least one processor 330, cause the apparatus at least to periodically report the channel state information comprising a plurality of reports in an aggregated form.

The at least one memory 310 may be any suitable form of memory, such as the onboard memory of a controller chip, a hard drive, various types of Random Access Memory (RAM), or Read-Only Memory (ROM). The computer program code 320 can be any appropriate form of computer instructions. The computer program code 320 may be provided in a compiled or interpreted form. The processor 330 can be any suitable processing device, such as but not limited to a Central Processing Unit (CPU), controller, or Application Specific Integrated Circuit (ASIC).

Figure 4:
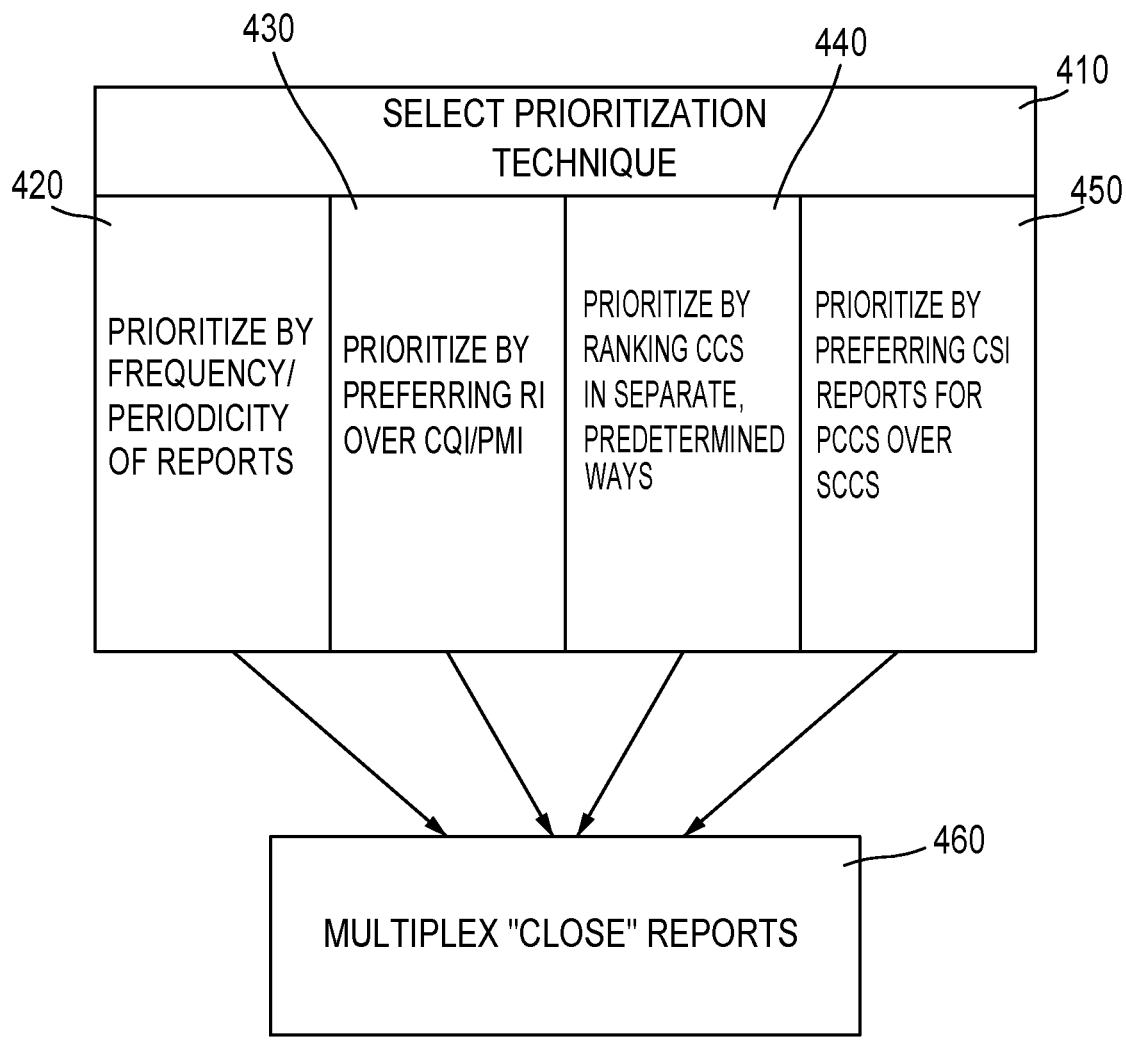
FIG. 4 illustrates a technique for constructing rules for handling component carrier aggregation.

FIG. 4 illustrates a technique for constructing rules for handling component carrier aggregation. As illustrated in FIG. 4, the technique can begin by selecting 410 a prioritization technique from a variety of techniques. Four such techniques are illustrated, although other techniques are permitted.

The first of the four techniques shown is to prioritize 420 by frequency/periodicity of reports. That is to say, a CC report that is to be infrequently reported may be given a higher priority than frequently reported CC reports or vice versa.

The second of the four techniques shown is to prioritize 430 by preferring RI over CGI/PMI (or vice versa). This technique permits the most important aspects of a CC report to be given priority over those that the system considers less important.

To prioritize 440 by ranking CCs in separate, predetermined ways is the third of the four techniques shown in FIG. 4. In this technique, each individual CC may be assigned a predetermined ranking and may be prioritized according to the predetermined ranking.

The fourth technique of the four techniques in FIG. 4 is to prioritize 450 by preferring CSI reports for PCCs over those for SCCs. This technique can permit the reports for PCCs to be given a preference, when it is not feasible to report on both PCCs and SCCs. Like the other priority schemes it can be reversed, if desired, such that SCCs are given a priority over PCCs.

Finally, in addition to the selected CC report of the various available CC reports, the system can multiplex 460 any "close" reports. In this case, "close" can refer to reports for the same or an adjacent physical resource block (PRB).

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. For example, although certain embodiments of the present invention have been discussed in relation to 3GPP system, it should be understood that the present invention may be applied to other system such as the Evolved Universal Terrestrial Radio Network (E-UTRAN) and the like. In order to determine the metes and bounds of the invention, therefore, reference should be made to the appended claims.

What is claimed is:

1. A method of operating a user equipment (UE), the method comprising:
    determining whether at least two of a plurality of channel state information (CSI) reports are to be transmitted on a physical uplink channel, each of the plurality of CSI reports related to a respective one of a plurality of component carriers;
    on a condition that the determination is positive, dropping at least one lower priority CSI report of the plurality of CSI reports, wherein:
        a CSI report containing a Rank Indicator (RI) is prioritized over one or more CSI reports containing a Channel Quality Indicator (CQI), and
        a CSI report containing a RI for a higher priority component carrier is prioritized over one or more CSI reports containing a RI for a lower priority component carrier; and
    transmitting, subsequent to the dropping, at least one prioritized CSI report of the plurality of CSI reports on the physical uplink channel.

2. The method of claim 1, wherein the physical uplink channel is a physical uplink control channel (PUCCH).

3. The method of claim 1, wherein the determining whether at least two of a plurality of CSI reports are to be transmitted on a physical uplink channel occurs on a subframe basis.

4. The method of claim 1, wherein each of the plurality of component carriers has an associated priority, the method further comprising:
    on a condition that there are no CSI reports for a primary component carrier, dropping at least one lower priority CSI report of the plurality of CSI reports, wherein a CSI report containing a RI for a component carrier with a highest associated priority is prioritized over one or more CSI reports containing a RI for a respective component carrier of lower associated priority.

5. A user equipment (UE) comprising:
    a processor operable to determine whether at least two of a plurality of channel state information (CSI) reports are to be transmitted on a physical uplink channel, each of the plurality of CSI reports related to a respective one of a plurality of component carriers;
    the processor further operable to, on a condition that the determination is positive, drop at least one lower priority CSI report of the plurality of CSI reports, wherein a CSI report containing a Rank Indicator (RI) is prioritized over one or more CSI reports containing a Channel Quality Indicator (CQI), and a CSI report containing a RI for a higher priority component carrier is prioritized over one or more CSI reports containing a RI for a lower priority component carrier; and
    a transmitter operable to transmit, subsequent to the dropping, at least one prioritized CSI report of the plurality of CSI reports on the physical uplink channel.

6. The UE of claim 5, wherein the physical uplink channel is a physical uplink control channel (PUCCH).

7. The UE of claim 5, wherein the processor is operable to determine whether at least two of a plurality of CSI reports are to be transmitted on a physical uplink channel occurs on a subframe basis.

8. The UE of claim 5, wherein each of the plurality of component carriers has an associated priority, and the processor is further operable to, on a condition that there are no CSI reports for a primary component carrier, drop at least one lower priority CSI report of the plurality of CSI reports, wherein a CSI report containing a RI for a component carrier with a highest associated priority is prioritized over one or more CSI reports containing a RI for a respective component carrier of lower associated priority.

9. A non-transitory computer readable storage medium comprising executable code stored thereon that, when executed by a processor, causes a user equipment (UE) to:
    determine whether at least two of a plurality of channel state information (CSI) reports are to be transmitted on a physical uplink channel, each of the plurality of CSI reports related to a respective one of a plurality of component carriers;
    on a condition that the determination is positive, drop at least one lower priority CSI report of the plurality of CSI reports, wherein:
        a CSI report containing a Rank Indicator (RI) is prioritized over one or more CSI reports containing a Channel Quality Indicator (CQI), and
        a CSI report containing a RI for a higher priority component carrier is prioritized over one or more CSI reports containing a RI for a lower priority component carrier; and
    transmit, subsequent to the dropping, at least one prioritized CSI report of the plurality of CSI reports on the physical uplink channel.

10. The non-transitory computer readable storage medium of claim 9, wherein the physical uplink channel is a physical uplink control channel (PUCCH).

11. The non-transitory computer readable storage medium of claim 9, wherein the determination of whether at least two of a plurality of CSI reports are to be transmitted on a physical uplink channel occurs on a subframe basis.

12. The non-transitory computer readable storage medium of claim 9, wherein each of the plurality of component carriers has an associated priority, further causing the UE to:

on a condition that there are no CSI reports for a primary component carrier, drop at least one lower priority CSI report of the plurality of CSI reports, wherein a CSI report containing a RI for a component carrier with a highest associated priority is prioritized over one or more CSI reports containing a RI for a respective component carrier of lower associated priority.

\* \* \* \* \*